(12) United States Patent
Hiroumi et al.

(10) Patent No.: US 9,149,874 B2
(45) Date of Patent: Oct. 6, 2015

(54) TOOL HOLDER

(75) Inventors: Yoshihisa Hiroumi, Osaka (JP); Shogo Kitamura, Tottori (JP)

(73) Assignee: Showa Tool Co., Ltd., Tottori (JP)

( * ) Notice: Subject to any disclaimer, the term of this patent is extended or adjusted under 35 U.S.C. 154(b) by 445 days.

(21) Appl. No.: 13/808,610

(22) PCT Filed: Jul. 22, 2010

(86) PCT No.: PCT/JP2010/062333
§ 371 (c)(1),
(2), (4) Date: Jan. 15, 2013

(87) PCT Pub. No.: WO2012/011178
PCT Pub. Date: Jan. 26, 2012

(65) Prior Publication Data
US 2013/0106067 A1    May 2, 2013

(51) Int. Cl.
*B23B 31/20* (2006.01)
*B23B 31/30* (2006.01)

(52) U.S. Cl.
CPC ............. *B23B 31/302* (2013.01); *B23B 31/204* (2013.01); *B23B 31/305* (2013.01); *Y10T 279/1216* (2015.01); *Y10T 279/1241* (2015.01);
(Continued)

(58) Field of Classification Search
CPC .. B23B 31/204; B23B 31/302; B23B 31/305; Y10T 279/1216; Y10T 279/1266; Y10T 279/17307; Y10T 279/17521
USPC .............. 279/4.03, 4.06, 4.07, 4.09, 43, 43.4, 279/43.5, 46.5, 50
See application file for complete search history.

(56) References Cited

U.S. PATENT DOCUMENTS

| 2,567,471 | A | * | 9/1951 | Collgert et al. | ............... | 279/4.03 |
| 3,679,219 | A | * | 7/1972 | Cameron | ..................... | 279/4.03 |

(Continued)

FOREIGN PATENT DOCUMENTS

| DE | 3417430 A1 | * | 11/1985 | ............. | B23B 31/30 |
| JP | 57096705 A | * | 6/1982 | ............. | B23B 31/30 |

(Continued)

OTHER PUBLICATIONS

International Search Report issued Aug. 17, 2010 in International (PCT) Application No. PCT/JP2010/062333.
(Continued)

*Primary Examiner* — Eric A Gates
(74) *Attorney, Agent, or Firm* — Wenderoth, Lind & Ponack, L.L.P.

(57) ABSTRACT

A tool holder includes a holder body having a trunk and a grip tube, a pressure ring fitted around the grip tube, a nut for axially moving the pressure ring, and a sleeve defining a pressure chamber around the outer periphery thereof. The trunk is formed with cylinders in which pistons are inserted respectively. The cylinders communicate with the pressure chamber through a communication channel. Hydraulic fluid is sealed in the cylinders, the communication channel and the pressure chamber. When the nut is rotated, the pressure ring is axially moved, thus radially compressing the grip tube. Simultaneously, the pistons are pushed into the respective cylinders, thus increasing the pressure in the pressure chamber. As a result, both a first holding hole formed in the grip and a second holding hole formed in the sleeve decrease in diameter, so that a tool inserted in these holes are held in position.

11 Claims, 3 Drawing Sheets

(52) U.S. Cl.
CPC .... *Y10T 279/1266* (2015.01); *Y10T 279/17307* (2015.01); *Y10T 279/17521* (2015.01)

(56) References Cited

U.S. PATENT DOCUMENTS

| | | | | |
|---|---|---|---|---|
| 3,727,930 | A | * | 4/1973 | Anderson ........................ 279/50 |
| 3,835,649 | A | * | 9/1974 | Le Testu ......................... 60/560 |
| 4,690,415 | A | * | 9/1987 | Holdridge ..................... 279/4.09 |
| 5,516,243 | A | * | 5/1996 | Laube ........................ 408/239 R |
| 5,524,909 | A | * | 6/1996 | Wyatt ............................... 279/50 |
| 5,944,325 | A | * | 8/1999 | Schmeisl ..................... 279/4.03 |
| 6,179,530 | B1 | * | 1/2001 | Retzbach et al. ......... 408/239 R |
| 6,311,987 | B1 | * | 11/2001 | Rinne et al. .................. 279/4.03 |
| 6,497,417 | B2 | * | 12/2002 | Wu .............................. 279/4.08 |
| 8,944,438 | B2 | * | 2/2015 | Andre .......................... 279/2.08 |

FOREIGN PATENT DOCUMENTS

| | | | | |
|---|---|---|---|---|
| JP | 63251106 | A | * 10/1988 | .............. B23B 31/30 |
| JP | 01321103 | A | * 12/1989 | .............. B23B 31/08 |
| JP | 8-187610 | | 7/1996 | |
| JP | 10-029106 | | 2/1998 | |
| JP | 11-077412 | | 3/1999 | |
| WO | WO 2013178681 | A1 | * 12/2013 | |

OTHER PUBLICATIONS

Written Opinion of the International Searching Authority, issued Aug. 17, 2010 in International (PCT) Application No. PCT/JP2010/062333 (with partial English translation).

* cited by examiner

TOOL HOLDER

TECHNICAL FIELD

This invention relates to a tool holder in which a holding strength and a holding area are increased to improve the retention stability and run-out accuracy of a tool to be held, and which is suitable for heavy cutting and high-precision cutting.

BACKGROUND ART

The following Patent Documents 1 and 2 disclose conventional tool holders used to hold rotary cutting tools.

The tool chuck disclosed in Patent Document 1 includes a chuck cylinder having a tool holding hole and a tapered outer peripheral surface, and a nut (tightening cylinder) mounted around the chuck cylinder through needle rollers. By tightening the nut, the chuck cylinder is radially compressed, so that a tool inserted in the tool holding hole can be securely held in position.

The chuck device disclosed in Patent Document 2 is a hydraulic chuck, wherein an elastically deformable sleeve is liquid-tightly fitted in a tapered inner peripheral portion having an opening at the front end of the body to define expansion rooms between the sleeve and the inner peripheral surface of the body. Hydraulic pressure is applied to the expansion rooms to diametrically compress the sleeve so that a tool inserted in the hole of the sleeve is securely held in position.

PRIOR ART DOCUMENTS

Patent Documents

Patent document 1: JP Patent publication 11-77412A
Patent document 2: JP Patent publication 10-29106A

SUMMARY OF THE INVENTION

Object of the Invention

According to the tool chuck disclosed in Patent Document 1, if the chuck cylinder is too long, the chuck cylinder may make it difficult to turn the nut. Thus, it is difficult to sufficiently increase the toll grip area by increasing the length of the chuck cylinder.

An area of a tool to be held by a holder is desirably larger to improve the holding strength and run-out accuracy of the tool. In the mechanical chuck disclosed in Patent Document 1, a larger holding area leads to a larger rotational resistance of the nut, making it difficult for the chuck cylinder to be diametrically small enough. This inevitably imposes restrictions on increasing the holding area, resulting in failure to improve the holding strength and the run-out accuracy of the tool.

The hydraulic chuck disclosed in Patent Document 2, on the other hand, is provided with a plurality of expansion rooms displaced from each other in an axial direction so that a tool can be held at a plurality of positions.

According to the structure where the expansion rooms provided at different positions are continuous to each other, the same hydraulic pressure is applied to these expansion rooms regardless of the distance therebetween. This structure may be advantageous for improving the tool run-out accuracy by increasing the distance between the positions where the tool is held.

According to the hydraulic chuck disclosed in Patent Document 2 wherein thin-walled portions of the sleeve corresponding to the expansion rooms deform partly expanding toward an inner-diameter side, the sleeve holds the tool by an almost linear contact. Therefore, it is difficult to exert a powerful and stable holding strength.

The expansion rooms should be provided at positions relatively distant from a mouth portion (opening end) of the sleeve to fluid-tightly seal the expansion rooms. As a result, the fastening at the mouth portion is not tight enough.

A hydraulic chuck, wherein the amount of diametrical reduction (interference) of the sleeve is significantly smaller than in mechanical chucks, is not suitable for holding any tools roughly accuracy-controlled where shank diameters are largely variable.

Other than these problems, whether the thinned portions of the sleeve meet an expected cylindricity may affect the run-out accuracy of a tool to be held. In the case where the thinned portions have uneven thicknesses in circumferential parts thereof, the amount of diametrical reduction differs from one part to another circumferentially in the thinned portions. This leads to difficulty in centering a tool to the center of the holder.

As described so far, the conventional tool holders, including the mechanical chuck and the hydraulic chuck both, have these specific disadvantages, failing to meet the demand to improve the retention stability and the run-out accuracy of a tool to be held.

An object of this invention is to accomplish improvements in both of the retention stability and the run-out accuracy of a tool to be held by eliminating the technical disadvantages of the conventional tool holders.

Means to Achieve the Object

To achieve the object, a tool holder according to this invention is provided with both a mechanical chuck and a hydraulic chuck, wherein these chucks are operated by manipulating a nut so that a tool is held by these two chucks.

In particular, the present invention provides a tool holder comprising a holder body including a main grip portion comprising a cylindrical grip tube located at a front end of the holder body and having a first tool holding hole, a tapered outer peripheral surface, and an axial slit, the holder body further including a trunk having a larger diameter than the grip tube, a pressure ring fitted around the tapered outer peripheral surface of the grip tube so as to be slidable in an axial direction of the tool holder, a nut coupled to the pressure ring so as to be rotatable relative to the pressure ring and kept in threaded engagement with an outer periphery of the trunk (2b), and a secondary grip portion comprising a sleeve having an annular groove in an outer periphery thereof, a second tool holding hole in a center part thereof, the second tool holding hole having an inner diameter smaller than an inner diameter of the first tool holding hole in a free state, and a thin-walled portion defined between a bottom of the annular groove and the second tool holding hole, the sleeve being inserted in an axial hole at the center of the holder body at a location rearwardly of the grip tube.

The annular groove is liquid-tightly isolated from the axial hole of the sleeve such that the annular groove serves as a pressure chamber. The tool holder further includes at least one cylinder provided in the trunk and having one end thereof open at a front end of the trunk, at least one piston axially slidably inserted in the cylinder with a front end portion of the piston protruding from the cylinder, a communication channel through which the cylinder communicates with the pressure chamber, and hydraulic fluid sealed in the cylinder, the communication channel, and the pressure chamber.

The tool holder is configured such that when, with a tool inserted in the tool holder, the nut is turned in one direction, the nut simultaneously moves axially rearwardly, the pressure ring moves axially rearwardly together with the nut, thereby radially compressing the grip tube while pushing the piston such that hydraulic pressure is produced in the pressure chamber, and the thin-walled portion of the sleeve is radially compressed by the hydraulic pressure, whereby the tool is gripped by the first tool holding hole and the second tool holding hole at the same time.

Preferably, the tool holder further includes a split collar having a plurality of circumferentially split portions and fitted around the outer periphery of the thin-walled portion.

The following arrangements are preferable.

(1) The at least one cylinder comprises a circumferentially equidistantly spaced apart cylinders, and the at least one piston comprises a plurality of pistons received in the respective cylinders.

(2) The holder body is formed with a tapered hole having a diameter decreasing toward a rear end of the holder body, and the tool holder further includes a tapered sleeve formed with a center hole and press-fitted in the tapered hole, and an elastic member biasing the tapered sleeve in a direction in which the tapered sleeve is pressed into the tapered hole, wherein the sleeve has a rear portion having a diameter corresponding to a diameter of the center hole of the tapered sleeve, and inserted in the center hole of the tapered sleeve.

(3) The nut is in threaded engagement with the trunk through a friction reducing member.

The friction reducing members may be conventional steel balls or needle rollers.

Advantages of the Invention

The tool holder according to this invention is provided with both the mechanical chuck and the hydraulic chuck, and the mechanical chuck, which diametrically reduces the grip tube to hold a tool by using the first tool holding hole, is provided at front end portion. Therefore, the shank of the tool is fastened through a surface contact with a large surface area of the first tool holding hole, and the tool is fastened in a stable manner at the mouth portion as well because an overall area of the holding cylinder is diametrically reduced.

The sleeve behind the grip tube constitutes the secondary grip portion, and the tool is also held by the second tool holding hole provided in the sleeve. This provides a larger holding area, thereby improving a holding strength.

The secondary grip portion constitutes the hydraulic chuck which is operated by a fluid pressure. By providing the secondary grip portion, a larger distance is ensured between tool holding points (distance between the grip tube and the secondary grip portion). As a result, the tool can achieve a better run-out accuracy.

Because the piston which operates the secondary grip portion is pushed and moved by the pressure ring diametrically reducing the grip tube, the tool is fastened and the fastened tool is unfastened by simply manipulating the nut.

In the case where the hydraulic chuck is structured such that a screw manipulated from outside is provided in a tool body and the piston is pushed and moved by the screw to generate fluid pressure, it becomes necessary to manipulate the nut to diametrically reduce the grip tube and manipulate the screw to diametrically reduce the secondary grip portion. Such a hydraulic chuck requires a complicated working operation, which is not suitable for practical use. The tool holder according to this invention, wherein the piston moves along with the movement of the nut, can solve the problem.

The hydraulic chuck has small power transmission loss despite a large distance between the cylinder and the pressure chamber. By using the hydraulic chuck as the secondary grip portion, possible increases of the rotational resistance of the nut are controlled to minimum.

The mechanical chuck, wherein a large interference is obtained, constitutes the mouth-portion side of the holder. Such a holder can easily hold any tools roughly accuracy-controlled where shank diameters are largely variable. Though the interference of the sub holder is smaller than that of the mechanical chuck, the first tool holding hole exerts a guiding effect when the tool is inserted in the second tool holding hole. Therefore, the holder is hardly subjected to restrictions when holding any tools roughly accuracy-controlled as compared to the chuck disclosed in Patent Document 2.

Because the mechanical chuck and the hydraulic chuck are combined and the mechanical chuck is used as the main gripping portion, the run-out accuracy of any tool thereby held is no longer largely affected by the cylindricity of the thin-walled portion of the sleeve constituting the secondary grip portion.

BEST MODE FOR EMBODYING THE INVENTION

The tool holder embodying this invention is now described referring to FIGS. 1 to 4.

Figure 1:
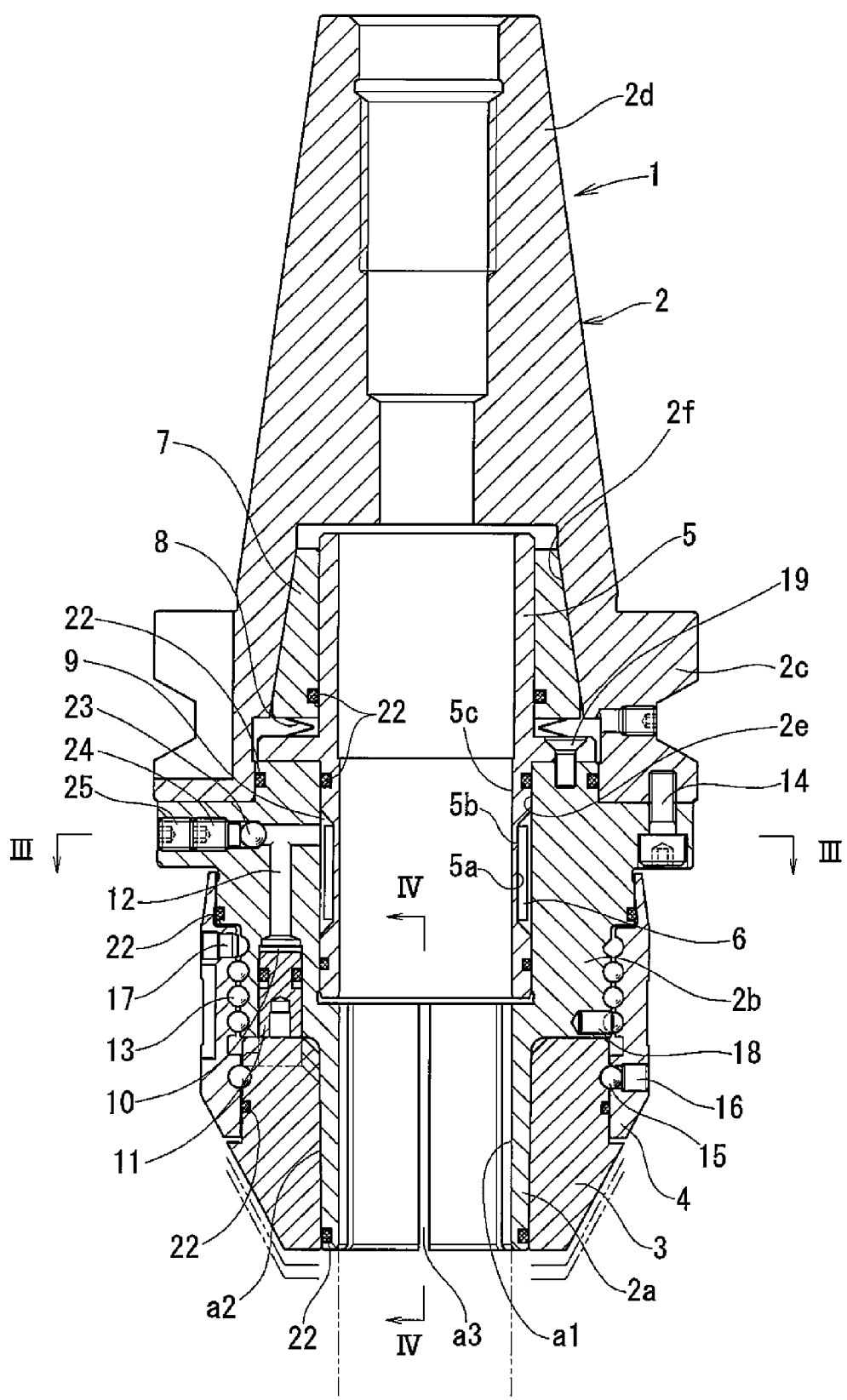
FIG. 1 is a sectional view of a tool holder embodying the present invention.
Figure 2:
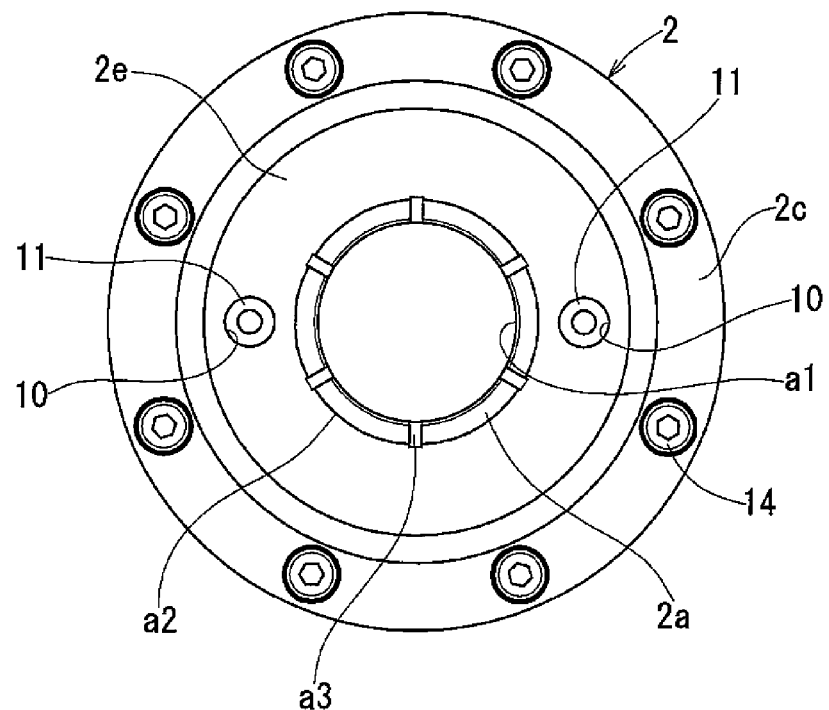
FIG. 2 is a front view of a tool body of the tool holder of FIG. 1.
Figure 3:
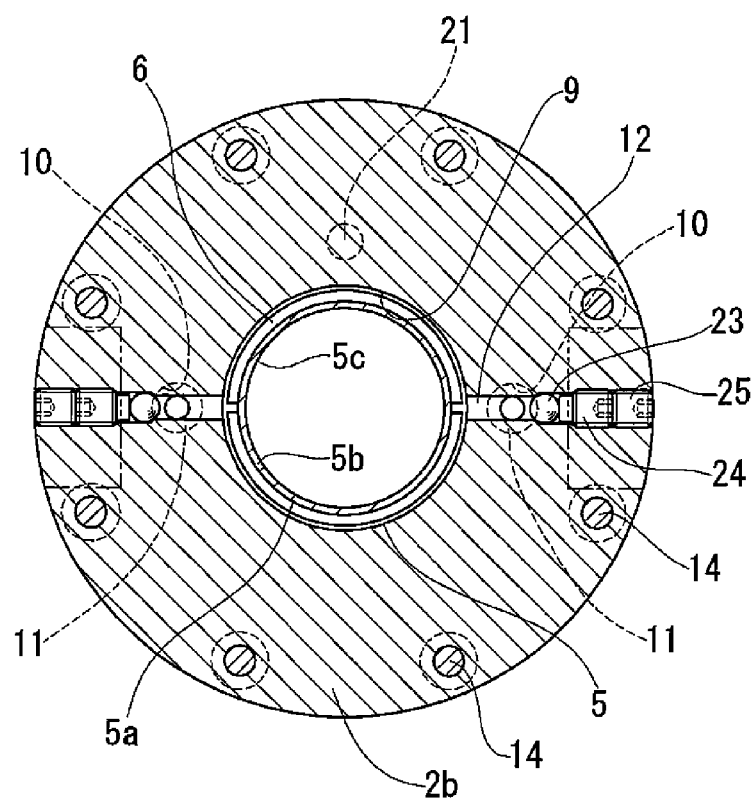
FIG. 3 is a sectional view taken along line III-III of FIG. 1.

As illustrated in FIG. 1, the tool holder 1 includes a holder body 2, a pressure ring 3, a nut 4 for axially driving the pressure ring 3, a sleeve 5 mounted in the holder body 2, and a split collar 6 fitted around the sleeve.

The tool holder further includes a tapered sleeve 7 located rearwardly of the split collar 6 (toward the rear end of the holder), an elastic member (disc spring in the example shown) 8 biasing the tapered sleeve in one direction, a pressure chamber 9 extending around the outer periphery of the sleeve 5, cylinders 10 formed in the holder body 2, pistons 11 inserted in the respective cylinders 10, a communication channel 12 which communicates the cylinders 10 with the pressure chamber 9, and a friction reducing member or members 13 (steel balls in the example shown) which reduce rotational resistance of the nut 4. Hydraulic fluid is sealed in the cylinders 10, pressure chamber 9, and communication channel 12.

The holder body 2 includes a cylindrical grip tube 2a, a trunk 2b, a flange 2c, and a shank 2d. The holder body 2 further has a straight axial hole 2e and a tapered hole 2f at the central portion thereof.

The grip tube 2a and the trunk 2b form a single integral body which is joined by means of bolts 14 to the end surface of the flange 2c, which is integral with the shank 2d.

The grip tube 2a protrudes from the front end of the trunk 2b and thus is located at the frontmost portion of the holder body. The grip tube 2a has a first tool holding hole a1, a tapered outer peripheral surface a2 tapered toward its front end, and axial slits a3. The axial slits a3 extend in the axial direction of the grip tube 2a from its front end. The slits a3 allow elastic deformation of the grip tube 2a such that its diameter decreases.

The trunk 2b of the tool body is larger in diameter than the grip tube 2a, and has a front flat end surface perpendicular to the axis of the holder and facing the rear end surface of the pressure ring 3.

The pressure ring 3 has an inner surface which is kept in surface-to-surface contact with the tapered outer peripheral surface a2 of the grip tube 2a so as to be axially slidable relative to the tapered outer peripheral surface a2. Annular grooves having a semicircular section are formed in the outer periphery of the pressure ring 3 and in the inner periphery of the nut 4, respectively, so as to face each other. Steel balls 15 are disposed between the pressure ring 3 and the nut 4 with first and second half portions of each steel ball 15 received in the respective annular grooves, thereby rotatably coupling the pressure ring 3 to the nut 4. The steel balls 15 can be inserted into the annular grooves through an inlet. Once the steels balls 15 are inserted in the annular grooves, the inlet is closed with a plug 16.

Helical grooves having a semicircular section are formed in the outer periphery of the trunk 2b and the inner periphery of the nut 4, respectively, so as to face each other. The friction reducing members 13 are inserted in the helical grooves such that the friction reducing members 13 serve as a thread and the spiral grooves serve as thread grooves, thereby threadedly engaging the nut 4 with the outer periphery of the trunk 2b. When the nut 4 is rotated, the nut 4 simultaneously axially moves, and the pressure ring 3 follows the axial movement of the nut 4. The steel balls as the friction reducing members are retained in the helical grooves by stopper pins 17 and 18.

The sleeve 5 has a second tool holding hole 5c at the center, and an annular groove 5a in a longitudinally intermediate part of the outer periphery thereof. defining a thin-walled portion 5b of the sleeve 5 between the bottom of the groove 5a and the second tool holding hole 5c. The sleeve 5 constitutes a secondary grip portion, and its front end portion is inserted in the axial hole 2e of the holder body at a position rearwardly of grip tube 2a.

In the embodiment, a flange 5d formed on the outer periphery of the sleeve 5 is fixed to the trunk 2b by means of screws 19.

The tapered hole 2f of the holder body 2 is tapered toward the rear end of the holder body 2, i.e. tapered such that its diameter decreases toward the rear end of the holder body. The tapered sleeve 7, which has a center hole, is pushed into the tapered hole 2f by the elastic member 8 so as to be centered relative to the tool body 2. In this state, the rear end portion of the sleeve 5, which has an outer diameter corresponding to the inner diameter of the center hole of the tapered sleeve 7, is inserted into the center hole of the tapered sleeve 7. The sleeve 5 is thus centered relative to the holder.

The inner diameter of the second tool holding hole 5c of the sleeve 5 is smaller than the inner diameter of the first tool holding hole at in a free state.

The annular groove 5a formed in the outer periphery of the sleeve 5, which is liquid-tightly isolated from the axial hole 2e, serves as the pressure chamber 9. The split collar 6 is fitted around the thin-walled portion 5b in the pressure chamber 9. The split color 6 substantially reduces the volume of the pressure chamber 9, thus enabling the pistons 11 to produce high pressure in the pressure chamber 9 with small strokes of the pistons 11.

The cylinders 10, which are formed in the trunk 2b, have their front ends open at the frond end surface of the trunk. For even distribution of the motion resistance applied to the pressure ring 3 when the nut 4 is tightened, and to minimize the piston strokes, it is preferable to provide a plurality of the cylinders 10 at circumferentially constant pitches. The tool holder shown has two such cylinders 10. But more than two cylinders may be used.

The pistons 11 are axially slidably inserted in the respective cylinders 10 with front end portions thereof protruding from the cylinders. When the pistons 11 are pushed by the pressure ring 3 into the cylinders 10, hydraulic fluid filling the cylinders is compressed.

The communication channel 12 is formed in the trunk 2b to communicate the pressure chamber 9 with the cylinders 10. Therefore, hydraulic pressure is generated in the pressure chamber 9 when the hydraulic fluid in the cylinders 10 is compressed.

Figure 4:
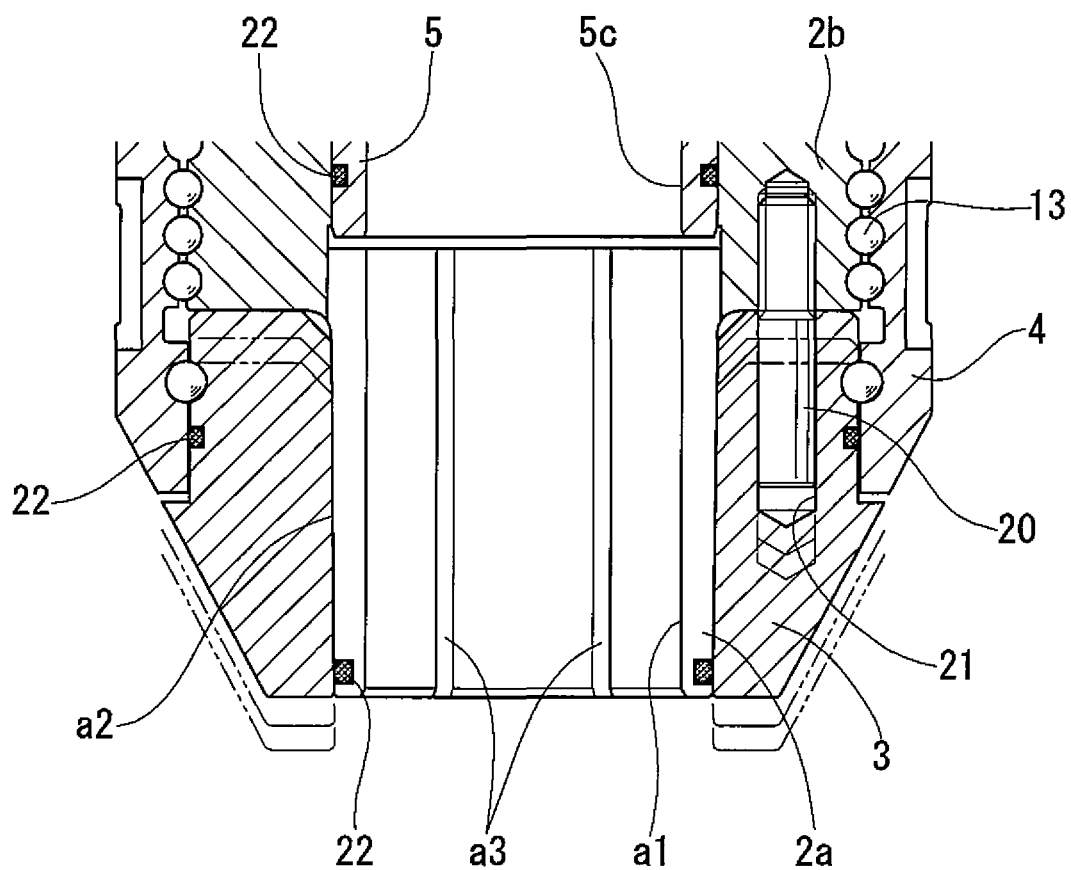
FIG. 4 is a sectional view taken along line IV-IV of FIG. 1.

The reference numeral 20 in FIG. 4 indicates a parallel pin fixed to the trunk 2b and protruding from the front end surface of the trunk in parallel with the axis of the holder. The parallel pin 20 is slidably inserted in a pin guide hole 21 formed in the rear end surface of the pressure ring 3. This prevents the pressure ring 3 from co-rotating with the nut 4 when the nut 4 is rotated.

But the parallel pin 20 and the pin guide hole 21 are not essential elements. If there are no parallel pin 20 and pin guide hole 21, the pressure ring 3 may rotate together with the nut 4 when the ring 3 is pressed against the pistons 11. This could cause the pistons 11 to skew in the cylinders and nick the cylinder walls. But when the pressure ring 3 is pressed against the pistons 11, the frictional force produced between the contact surfaces of the pistons 11 and the pressure ring 3 could stop the rotation of the pressure.

O-rings 22 in FIG. 1 seal gaps between various interfaces of the tool. In particular, the O-rings 22 are provided between the outer periphery of the sleeve 5 and the inner periphery of the axial hole 2e on both sides of the pressure chamber 9, between the grip tube 2a and the pressure ring 3, between the pressure ring 3 and the nut 4, between the nut 4 and the trunk 2b, between the outer periphery of the trunk and the inner-diameter surface of the flange 2c, and between the outer periphery of the sleeve 5 and the inner periphery of the tapered sleeve 7. But the O-rings other than those sealing the pressure chamber 9 are not essential elements.

As shown in FIG. 1, a ball 23 is received in a hole formed when forming the communication channel 12, and pressed against a seating surface of this hole by a screw 24, thereby liquid-tightly sealing the opening of the hole. A screw 25 prevents the screw 24 from loosening.

Now in operation of this tool holder 1, when the nut 4 is turned in the direction in which the nut 4 is simultaneously moved axially rearwardly, the pressure ring 3 is also moved axially rearwardly. The pressure ring 3 thus compresses the grip tube 2a such that the diameter of the first tool holding hole at decreases.

At the same time, the pressure ring 3 pushes the pistons 11 into the respective cylinders, generating hydraulic pressure in the pressure chamber 9. The generated hydraulic pressure deforms the thin-walled portion 5b of the sleeve 5 so as to swell inward, thereby reducing the diameter of the second tool holding hole 5c. As a result, a tool is held by the first and second tool holding holes a1 and 5c at the same time.

When the tool is held by the first tool holding hole a1, in other words, when the tool is held by the mechanical chuck, the shank of the tool makes a surface contact with the entire surface area of the first tool holding hole a1. This ensures firm and stable clamping of the tool over a large area of the tool holder including the mouth portion of the holder.

When the tool is further held by the second tool holding hole 5c, which located rearwardly of the grip tube 2a, the holding area is thereby increased. As a result, the run-out accuracy of the tool improves and the holding strength increases.

Since the pistons 11 are pushed by the pressure ring 3, a tool can be easily fastened to and dismounted from the tool holder simply by turning the nut 4.

As the friction reducing members 13 interposed between the nut 4 and the barrel portion 2b, instead of the steel balls in the described example, needle rollers may be used.

DESCRIPTION OF THE NUMERALS

1. Tool holder
2. Holder body
2a. Grip tube
2b. Trunk
2c. Flange
2d. Shank
2e. Axial hole
2f. Tapered hole
a1. First tool holding hole
a2. Tapered outer peripheral surface
a3. Vertical slit
3. Pressure ring
4. Nut
5. Sleeve
5a. Annular groove
5b. Thin-walled portion
5c. Second tool holding hole
5d. Flange
6. Split collar
7. Tapered sleeve
8. Elastic member
9. Pressure chamber
10. Cylinder
11. Piston
12. Communication channel
13. Friction reducing member
14. Bolt
15. Steel ball
16. Plug
17, 18. Stopper pin
19, 24, 25. Screw
20. Parallel pin
21. Pin guide hole
22. O ring
23. Ball

What is claimed is:

1. A tool holder comprising:
   a holder body (2) including a main grip portion comprising a cylindrical grip tube (2a) located at a front end of the holder body (2) and having a first tool holding hole (a1), a tapered outer peripheral surface (a2), and an axial slit (a3), said holder body (2) further including a trunk (2b) having a larger diameter than the grip tube (2a);
   a pressure ring (3) fitted around the tapered outer peripheral surface (a2) of the grip tube (2a) so as to be slidable in an axial direction of the tool holder;
   a nut (4) coupled to the pressure ring (3) so as to be rotatable relative to the pressure ring (3) and kept in threaded engagement with an outer periphery of the trunk (2b);
   a secondary grip portion comprising a sleeve (5) having an annular groove (5a) in an outer periphery thereof, a second tool holding hole (5c) in a center part thereof, the second tool holding hole (5c) having an inner diameter smaller than an inner diameter of the first tool holding hole (a1) in a free state, and a thin-walled portion (5b) defined between a bottom of the annular groove (5a) and the second tool holding hole (5c), the sleeve (5) being inserted in an axial hole (2e) at the center of the holder body at a location rearwardly of the grip tube (2a);
   wherein the annular groove (5a) is liquid-tightly isolated from the axial hole (2e) of the sleeve (5) such that the annular groove (5a) serves as a pressure chamber (9);
   at least one cylinder (10) provided in the trunk (2b) and having one end thereof open at a front end of the trunk;
   at least one piston (11) axially slidably inserted in the cylinder (10) with a front end portion of the piston (11) protruding from the cylinder;
   a communication channel (12) through which the cylinder (10) communicates with the pressure chamber (9); and
   hydraulic fluid sealed in the cylinder (10), the communication channel (12), and the pressure chamber (9),
   wherein the tool holder is configured such that when, with a tool inserted in the tool holder, the nut (4) is turned in one direction, the nut (4) simultaneously moves axially rearwardly, the pressure ring (3) moves axially rearwardly together with the nut (4), thereby radially compressing the grip tube (2a) while pushing the piston (11) such that hydraulic pressure is produced in the pressure chamber (9), and the thin-walled portion (5b) of the sleeve is radially compressed by the hydraulic pressure, whereby the tool is gripped by the first tool holding hole (a1) and the second tool holding hole (5c) at the same time.

2. The tool holder of claim 1, further comprising a split collar (6) comprising a plurality of circumferentially split portions and fitted around the outer periphery of the thin-walled portion (5b).

3. The tool holder of claim 2, wherein said at least one cylinder (10) comprises a circumferentially equidistantly spaced apart cylinders, and wherein said at least one piston (11) comprises a plurality of pistons received in the respective cylinders (10).

4. The tool holder of claim 2, wherein the holder body (2) is formed with a tapered hole (2f) having a diameter decreasing toward a rear end of the holder body, and wherein the tool holder further comprises a tapered sleeve (7) formed with a center hole and press-fitted in the tapered hole (2f), and an elastic member (8) biasing the tapered sleeve in a direction in which the tapered sleeve is pressed into the tapered hole (2f), wherein the sleeve (5) has a rear portion having a diameter corresponding to a diameter of the center hole of the tapered sleeve (7), and inserted in the center hole of the tapered sleeve (7).

5. The tool holder of claim 1, wherein said at least one cylinder (10) comprises a circumferentially equidistantly spaced apart cylinders, and wherein said at least one piston (11) comprises a plurality of pistons received in the respective cylinders (10).

6. The tool holder of claim 2, wherein the nut (4) is in threaded engagement with the trunk (2b) through a friction reducing member (13).

7. The tool holder of claim 5, wherein the holder body (2) is formed with a tapered hole (2f) having a diameter decreasing toward a rear end of the holder body, and wherein the tool holder further comprises a tapered sleeve (7) formed with a center hole and press-fitted in the tapered hole (2f), and an elastic member (8) biasing the tapered sleeve in a direction in which the tapered sleeve is pressed into the tapered hole (2f), wherein the sleeve (5) has a rear portion having a diameter corresponding to a diameter of the center hole of the tapered sleeve (7), and inserted in the center hole of the tapered sleeve (7).

8. The tool holder of claim 5, wherein the nut (4) is in threaded engagement with the trunk (2*b*) through a friction reducing member (13).

9. The tool holder of claim 1, wherein the holder body (2) is formed with a tapered hole (2*f*) having a diameter decreasing toward a rear end of the holder body, and wherein the tool holder further comprises a tapered sleeve (7) formed with a center hole and press-fitted in the tapered hole (2*f*), and an elastic member (8) biasing the tapered sleeve in a direction in which the tapered sleeve is pressed into the tapered hole (2*f*), wherein the sleeve (5) has a rear portion having a diameter corresponding to a diameter of the center hole of the tapered sleeve (7), and inserted in the center hole of the tapered sleeve (7).

10. The tool holder of claim 9, wherein the nut (4) is in threaded engagement with the trunk (2*b*) through a friction reducing member (13).

11. The tool holder of claim 1, wherein the nut (4) is in threaded engagement with the trunk (2*b*) through a friction reducing member (13).

* * * * *